Jan. 9, 1945.  W. B. GOODMAN  2,366,852
INTERNAL-COMBUSTION ENGINE
Filed Dec. 27, 1941  6 Sheets-Sheet 2

INVENTOR
WILLARD B. GOODMAN
BY
ATTORNEY

Jan. 9, 1945.  W. B. GOODMAN  2,366,852
INTERNAL-COMBUSTION ENGINE
Filed Dec. 27, 1941  6 Sheets-Sheet 5

INVENTOR
WILLARD B. GOODMAN
BY
ATTORNEY

Jan. 9, 1945.  W. B. GOODMAN  2,366,852
INTERNAL-COMBUSTION ENGINE
Filed Dec. 27, 1941  6 Sheets—Sheet 6

INVENTOR
WILLARD B. GOODMAN
BY
ATTORNEY

Patented Jan. 9, 1945

2,366,852

UNITED STATES PATENT OFFICE 2,366,852

INTERNAL-COMBUSTION ENGINE

Willard B. Goodman, Los Angeles, Calif., assignor to Wright Aeronautical Corporation, a corporation of New York Application December 27, 1941, Serial No. 424,563

7 Claims. (Cl. 123—55)

This invention relates to engines and is concerned with multiple cylinder engines particularly adapted for aircraft use.

A particular object of the invention is to provide an engine in which a large plurality of engine cylinders are used, several groups of said cylinders each cooperating with separate crankshaft units which are drivably connected to a power output shaft through torsionally resilient shafting means. By this system, the crankshaft for each group of cylinders transmits the torque only from that group of cylinders and is not called upon to assume power loading from the other crankshaft units of the engine.

A further object of the invention is to provide a plurality of tandem engine units, each unit of which has its own crankshaft; additional shafting is provided to which each crankshaft is drivably connected, said additional shafting comprising the output shafting for the engine.

A further object of the invention is to provide an engine having a plurality of tandem crankshafts in coaxial relation, the adjacent ends of consecutive crankshafts being piloted one within the other for relative rotational movement.

An associated object is to provide means exterior of the crankshafts for securing them in substantially the same rotational relationship at all times, but permitting of slight relative oscillation therebetween.

Still another object of the invention is to provide a crankshaft system in which crankshaft power is delivered to a plurality of high speed layshafts from which engine power is taken.

Another object of the invention is to provide various mechanical improvements in an engine, associated with the above objectives, which improvements will become apparent in reading the annexed detailed description in connection with the drawings, in which.

In general, the engine of the invention comprises a plurality of radial cylinder engine units in tandem relation. For instance, each engine unit is a 14-cylinder assembly with its own crankshaft and with the cylinders arranged in two banks of seven cylinders each. When three such units are assembled in end-to-end relation the resulting engine has, of course, 42 cylinders and the cylinders are alined in fore-and-aft rows of 6 each. Accordingly, one might consider the engine as a 7-row assembly wherein each row has 6 cylinders, or as a 6-bank assembly wherein each bank has 7 cylinders.

Each crankshaft unit for 14 cylinders or two banks of 7 cylinders each, has two crankthrows and such a shaft assumes only the power imposed upon it by the cylinders associated directly with it. Such a shaft, though in tandem arrangement with other similar shafts, does not have to transmit the power produced by any of the other shafts. Each crankshaft is provided with a large gear and around the engine, between adjacent rows of cylinders, a high speed layshaft is borne, these several layshafts having pinions engaged with the large gears of the several crankshafts. The forward ends of the several layshafts project from one end of the cylinder assembly of the engine and serve to drive an output shaft and certain engine accessories. The other ends of the layshafts are either individually or jointly connected with other engine accessories.

Figure 2:
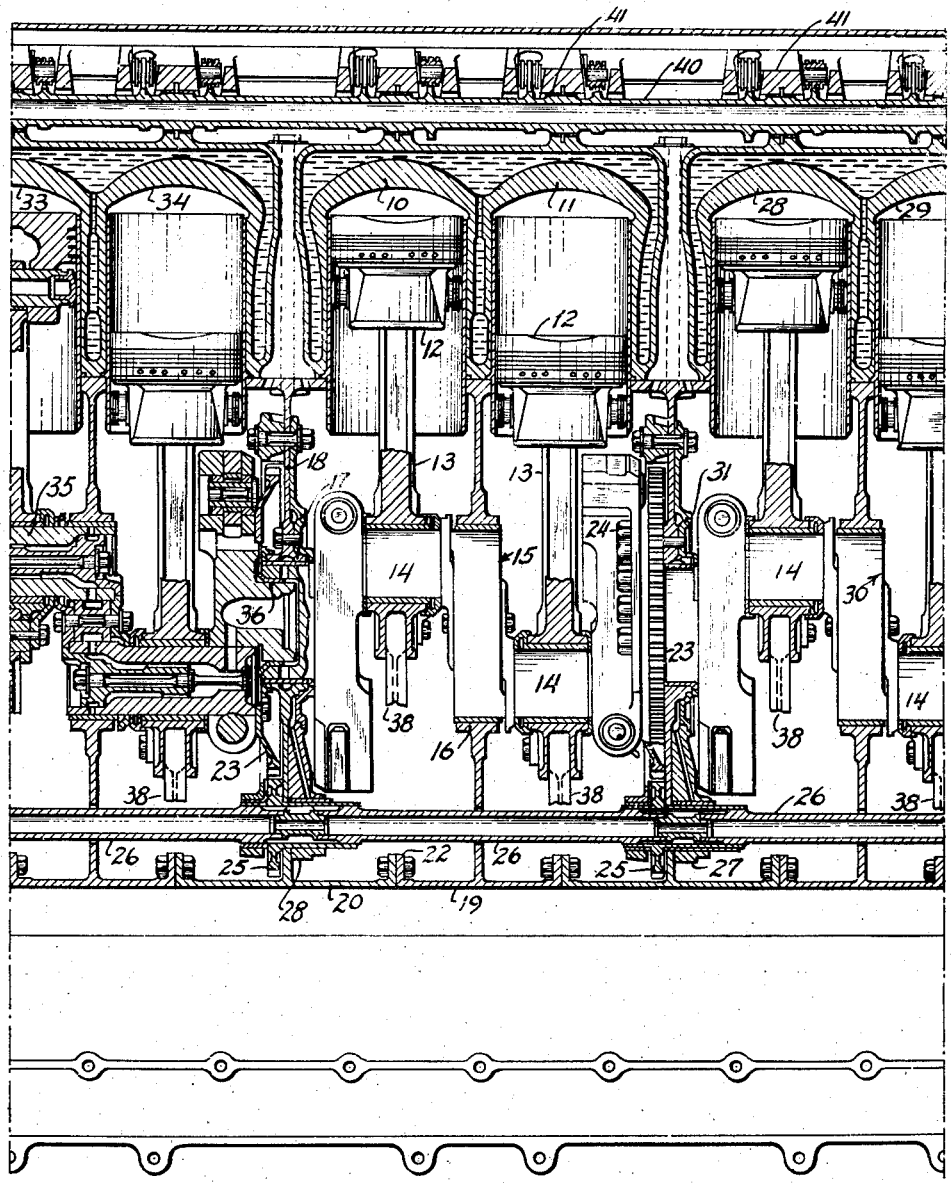
Fig. 2 is a longitudinal section through a central part of the engine.

For details, reference may first be made to Fig. 2 in which 10 and 11 indicate two cylinders of one of the seven radial rows of the central engine unit, these cylinders having pistons 12 and connecting rods 13 engaging journals 14 of a 2-throw crankshaft 15. The shaft 15 is journaled in a central bearing diaphragm 16 and at its front end the shaft is journaled at 17 in a bearing diaphragm 18, said diaphragms comprising integral parts of crankcase sections 19 and 20, respectively bolted together along the diametral plane of each bank of cylinders as at 22. To the crankcheek at the rear of the crankshaft 15, a drive gear 23 is bolted as at 24, this gear being meshed with a pinion 25 on a jointed layshaft 26 supported in bearings 27 and 28 in the crankcase bearing diaphragms. A rear engine unit shown in Fig. 2 to the right of the gear 23 forms an integral structure with the first mentioned engine unit and includes cylinders 28 and 29 each having pistons and connecting rods engaging a crankshaft 30 which, like the crankshaft 15, is carried in appropriate bearing diaphragms, the forward bearing being indicated at 31. The rear journal of the crankshaft 15 is piloted within the front journal of the crankshaft 30 for free oscillation relative thereto.

Figure 3:
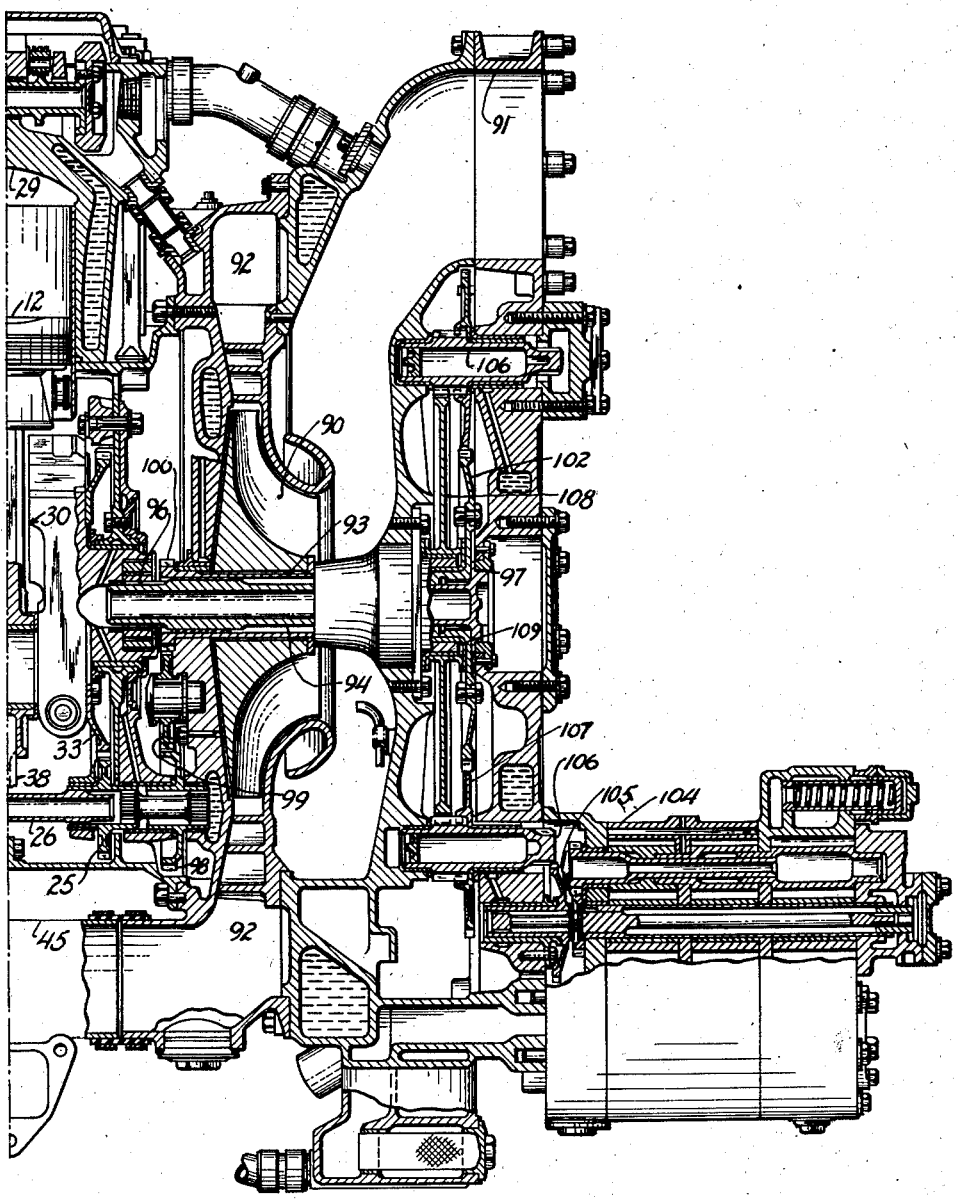
Fig. 3 is a longitudinal section through a rearward part of the engine.
Figure 4:
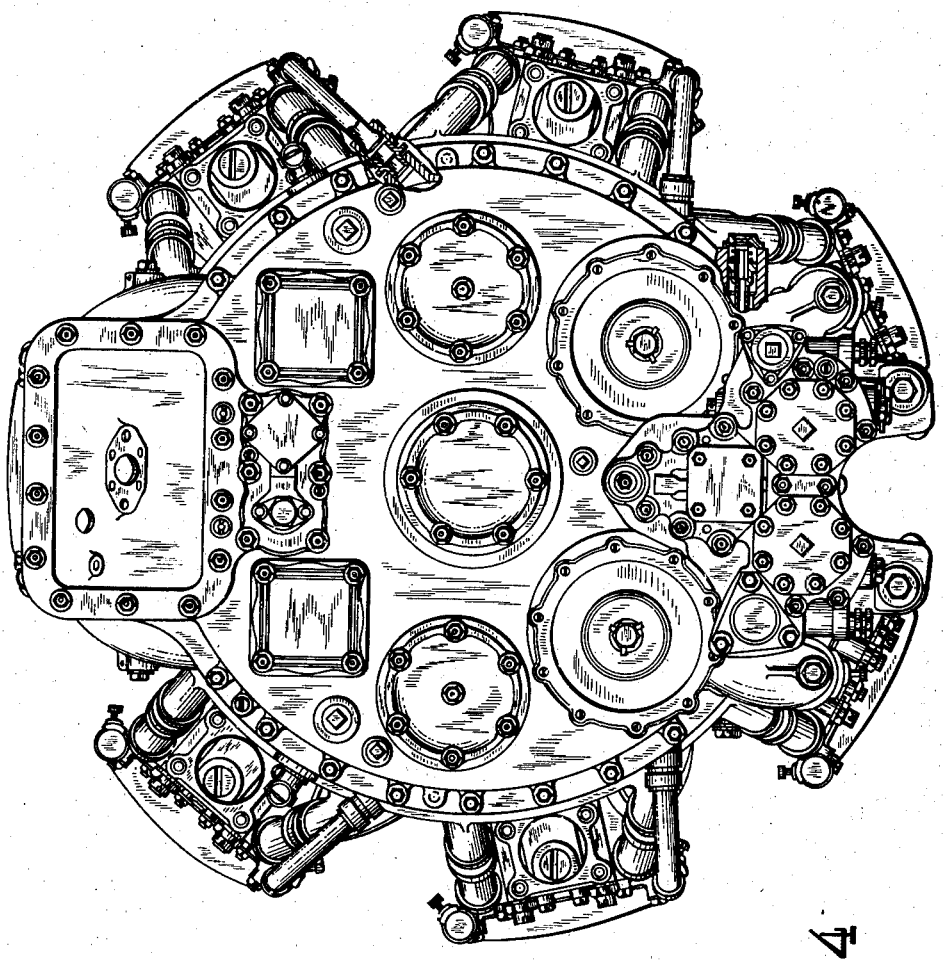
Fig. 4 is a rear elevation of the engine.
Figure 5:
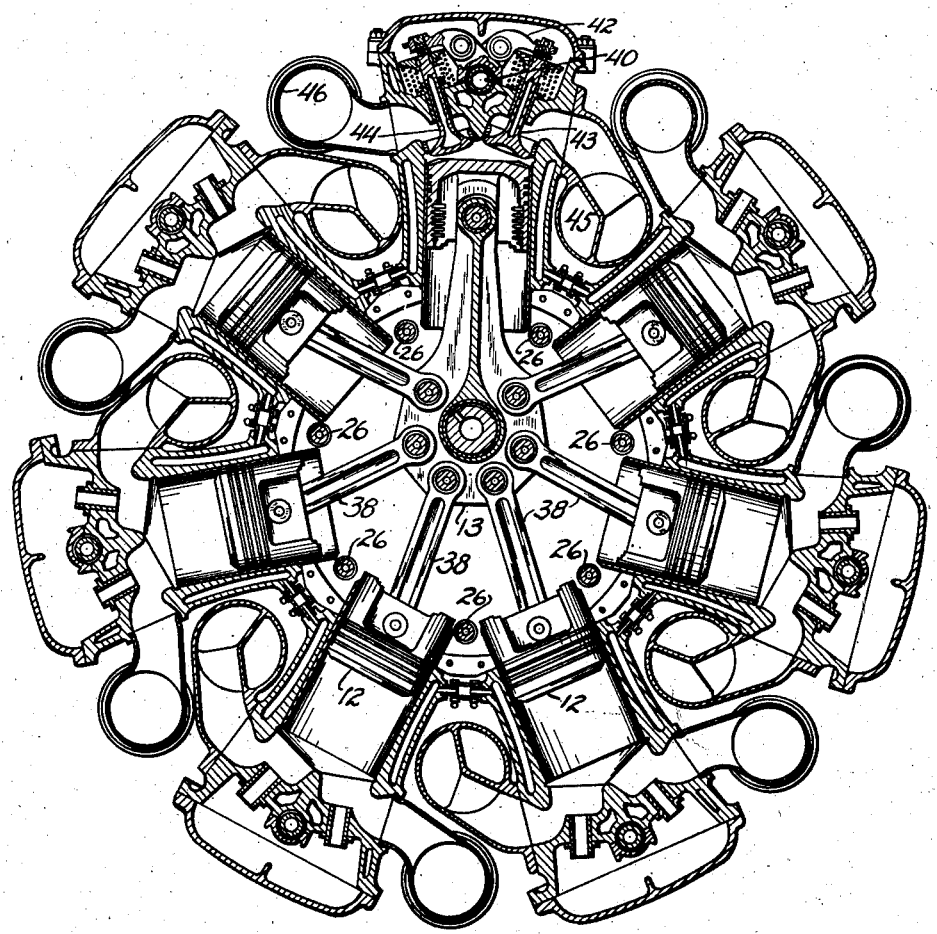
Fig. 5 is a transverse section through the engine taken on a plane through a forward or rearward cylinder bank.

Forward of the central engine unit, a forward engine unit is disposed comprising cylinders 33 and 34 with which are associated pistons and connecting rods, the latter engaging a crankshaft 35 whose central and forward journals are carried in crankcase bearing diaphragms and whose rear journal is piloted as at 36 in the forward journal of the crankshaft 15 for free oscillation relative thereto. The rear crankcheek of the crankshaft 35 carries a gear 23 engaged with pinions 25 on layshaft sections 26. Similarly, as shown in Fig. 3, the rear cheek of the rear crankshaft 30 carries a gear 33 engaging pinions 25 on portions of the jointed layshafts 26. As shown in Fig. 5, the several layshaft assemblies 26, equal in number to the number of cylinders in each bank, are disposed between said cylinders near their lower ends. The pistons of the other cylinders in each bank, as shown in Fig. 5, carry connecting rods 38 articulated to the connecting rods 13 which are master connecting rods.

Figure 6:
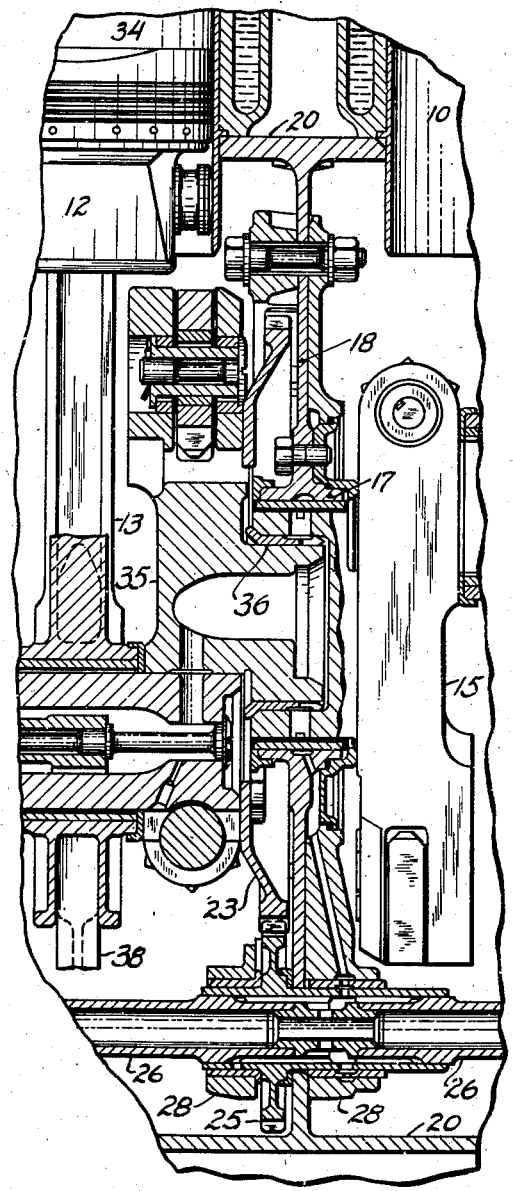
Fig. 6 is an enlarged longitudinal section through a portion of Fig. 2.

Fig. 6 shows the details of construction and arrangement of the pilot joint 36 between two adjacent crankshafts such as 15 and 35 along with the driving connection from the crankshaft 35 to one of the layshafts 26.

For unity of construction, each longitudinal row of cylinders preferably is cast en-bloc, although the cylinders could readily be made in pairs or as single units. Along the top of each row a camshaft 40 is disposed, said camshaft being borne in bearings 41 and having cam lobes operating upon rocker arms 42 acting upon intake and exhaust valves 43 and 44 in the several cylinder heads, in a more or less conventional manner. Fuel is supplied to the several cylinders of each row through an intake manifold 45 lying in the V defined between adjacent cylinder rows. Products of combustion from the several cylinders of each row are delivered from the exhaust ports to longitudinally extending manifolds 46 also disposed in the V between rows of cylinders but lying outwardly from the intake manifolds 45.

Figure 1:
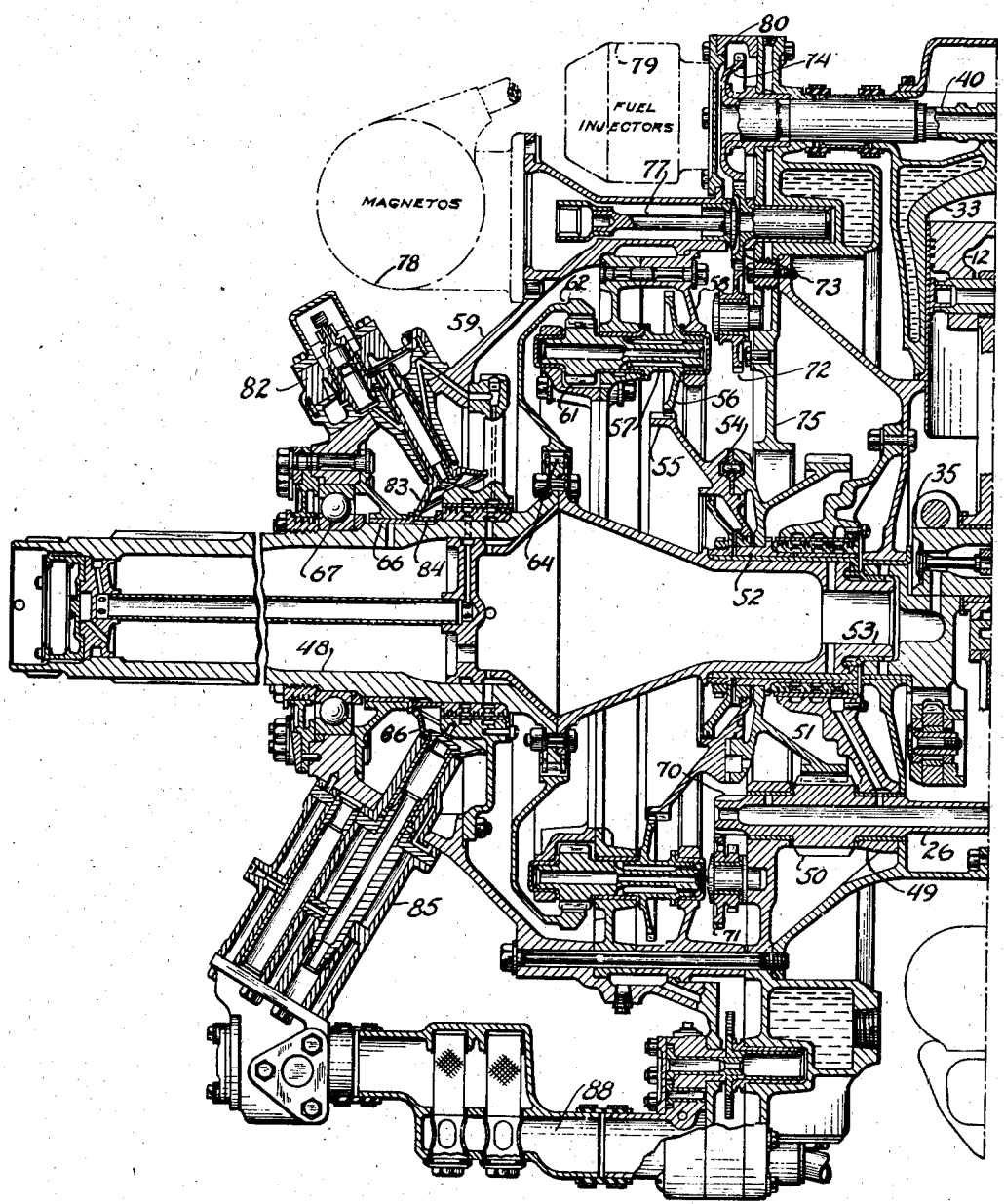
Fig. 1 is a longitudinal section through the front part of an engine.
Figure 7:
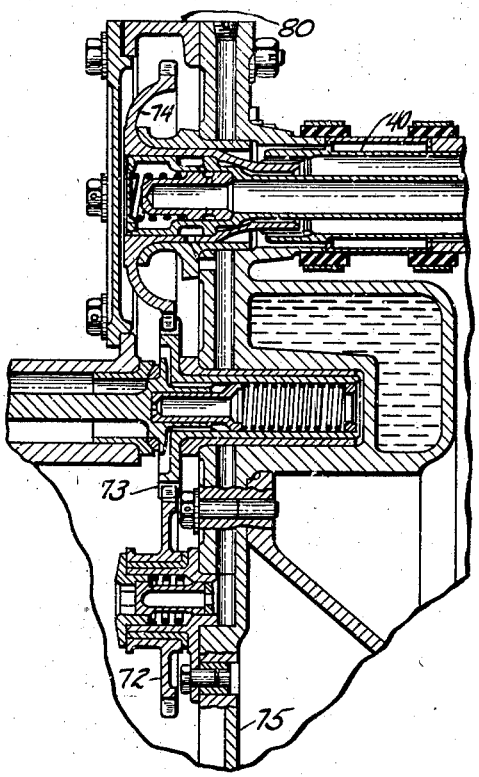
Fig. 7 is an enlarged longitudinal section through a portion of Fig. 1.

Referring to Figs. 1 and 7, I show the gear system by which engine power is taken from the layshafts 26 to a propeller shaft 48. Each layshaft 26, forward of its bearing 49 in the front bearing diaphragm of the forward engine unit, carries a pinion 50 meshed with a central gear 51 piloted through bushings 52 toward the rear end of the propeller shaft 48. The extreme rear end of the shaft 48 comprises a journal 53 piloted in the front journal of the crankshaft 35. The gear 51, receiving power from the several layshafts 26, transmits it through a torque meter 54 (the details of which are unimportant to the present disclosure) to a gear 55 meshed with pinions 56 on layshafts 57 journaled in bearings 58 carried by a nose section 59 of the crankcase. Said shafts 57 also carry pinions 61 meshed with a ring gear 62 secured to the propeller shaft 48 through a splined connection 64. The forward portion of the propeller shaft 48 is carried in a plain radial bearing 66 and a ball thrust bearing 67 in the crankcase nose section 59.

Forward of the drive pinion 50 of each layshaft 26 is a pinion 70 meshed with an idler gear 71, meshed consecutively with an idler gear 72, an idler gear 73, and a camshaft drive gear 74 drivably secured to the front end of the camshaft 40. There is an idler gear train 71, 72, 73 for each camshaft and its gear 74 and these gears are carried on journals secured to a bearing plate 75 rigid with the engine crankcase and the crankcase nose section 59. One or more of the idler gears may be used to drive auxiliary equipment of the engine. For instance, in Fig. 1 the idler gear 73 is coupled to a shaft 77 for the purpose of driving a magneto indicated at 78. Also, the gear 74 is indicated as being drivably connectible with a fuel injector unit 79 secured to the front end of the camshaft front housing 80.

In addition to the mechanisms thus far described in connection with Fig. 1, a propeller governor drive unit 82 is secured to the crankcase nose section 59 and is driven by a gear 83 meshed with a bevel gear 84 on the propeller shaft 48. Also, an oil pump unit 85 is secured to the lower end of the crankcase nose section 59 and is driven through a gear 86 from the propeller shaft gear 84. Said oil pump unit, though not important in detail as regards the present invention, includes a pressure pump unit in tandem with a scavenging pump unit, the former delivering oil from an external oil reservoir to the engine, and the latter withdrawing surplus oil from the front end of the engine and discharging it to the separate oil reservoir. Scavenge oil for the scavenging end of the oil pump unit passes through a duct 88.

Referring to Fig. 3, I show the engine rear section as including a supercharger impeller 90 receiving air or gas from an air intake duct 91 and delivering it to a diffusion chamber 92 connecting directly with the several intake manifolds 45. The impeller 90 is carried on a sleeve shaft 93 piloted on a central shaft 94 having a splined connection 96 with the rear end of the rear crankshaft 30, said shaft 94 at its rear end being journaled in a bearing 97 in the rear housing of the engine. The supercharger impeller shaft 93 is driven from one or more of the layshafts 26 through a gear train comprising a layshaft gear 98, an idler gear 99, and an impeller shaft gear 100.

The rear end of the extension shaft 94 carries a gear 102 which serves to drive one or more engine auxiliaries mounted upon the rear crankcase section. Such an auxiliary comprises, for instance, a rear oil pump assembly 104 having a drive gear 105. The latter gear is meshed with an intermediate shaft 106 which carries a gear 107 meshed with the gear 102. A plurality of engine auxiliaries may be disposed around the crankcase rear section and drive for them may be taken from a large gear 108 piloted on a bearing 109 coaxial with the engine crankshafts and driven from one or more countershafts 106. The arrangement of this gearing may, of course, be altered as desired to secure appropriate speeds for the auxiliary driven apparatus.

The drawings show the engine cylinders as being liquid-cooled, but the details of the cooling system and of the lubricating system comprise a separate invention and therefore will not be described in detail.

In the above specification applicant has avoided a detailed description of all of the mechanisms embraced within the engine, but rather has concentrated on those structures and their relationships which cooperate to provide a novel form of engine arrangement, a novel form of crankshaft and cylinder disposition, and a novel form of power take-off from a plurality of crankshafts to a central power output shaft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a power plant, a plurality of tandem arranged engine units each having a crankshaft, the crankshafts being coaxial, the adjacent ends of said crankshafts being piloted one within the other and capable of relative rotation, a gear on each crankshaft, a layshaft parallel to the several crankshafts having pinions thereon engaged by the crankshaft gears, and an output shaft driven by said layshaft.

2. In an engine, an elongated casing having a plurality of bearing diaphragms thereacross, a first crankshaft borne at its one end in the first diaphragm and at its other end in a second diaphragm, a second crankshaft borne at its one end in the adjacent end of the first crankshaft and at its other end in a third diaphragm, a drive gear at one end of each crankshaft, a plurality of layshafts borne in said casing each having a gear engaged with each crankshaft gear, and a power take-off from said layshafts.

3. In an internal combustion engine, a plurality of in-line rows of radially extending engine cylinders, said cylinder rows being circumferentially spaced about a common axis, crank shaft means for said cylinders comprising a plurality of serially and co-axially disposed individual crankshafts, a plurality of layshafts corresponding in number to the number of cylinder rows and circumferentially spaced about said crank shaft means, each of said layshafts being disposed between a pair of adjacent cylinder rows, gear connections between each of said crankshafts and layshafts, and cam means driven by each layshaft, each of said cam means respectively serving one of said cylinder rows.

4. In an internal combustion engine, a crankcase of tubular cross-section, a plurality of in-line rows of engine cylinders mounted on said crankcase and extending radially outward therefrom, said cylinder rows being circumferentially spaced about a common axis, crankshaft means for said cylinders, said crankshaft means being disposed within said crankcase and comprising a plurality of serially and co-axially disposed individual crankshafts, a plurality of layshafts disposed within said crankcase and about said crankshaft means, each of said layshafts being disposed between a pair of adjacent cylinder rows, gear connections for transmitting power from each of said crankshafts to each of said layshafts, each of said gear connections providing a step-up drive from said crankshafts to said layshafts, and an output shaft drivably connected to said layshafts.

5. In an internal combustion engine, the combination recited in claim 4 and in which said gear connections each provide a permanent connection between said crankshafts and layshafts.

6. In an internal combustion engine, a plurality of inline rows of radially extending engine cylinders, said cylinder rows being circumferentially spaced about a common axis, crankshaft means for said cylinders comprising a plurality of serially and co-axially disposed individual crankshafts, a plurality of layshafts corresponding in number to the number of cylinder rows and circumferentially spaced about said crankshaft means, each of said layshafts being disposed between a pair of adjacent cylinder rows, gear connections between each of said crankshafts and layshafts for transmitting power from each crankshaft to each layshaft, an engine output shaft driven by said layshafts, and engine auxiliaries driven by said layshafts.

7. In an internal combustion engine, a crankcase of tubular cross-section, a plurality of inline rows of engine cylinders mounted on said crankcase and extending radially outward therefrom, said cylinder rows being circumferentially spaced about a common axis, crankshaft means for said cylinders, said crankshaft means being disposed within said crankcase and comprising a plurality of serially and co-axially disposed individual crank shafts, a layshaft disposed within said crankcase between the bases of a pair of adjacent cylinder rows, gear connections for transmitting power from each of said crankshafts to said layshaft, each of said gear connections providing a step-up drive from said crankshafts to said layshaft, and an output shaft drivably connected to said layshaft.

WILLARD B. GOODMAN.